(12) United States Patent
Mori et al.

(10) Patent No.: US 7,485,987 B2
(45) Date of Patent: Feb. 3, 2009

(54) POWER CONVERTING DEVICE

(75) Inventors: Osamu Mori, Tokyo (JP); Masaki Yamada, Tokyo (JP); Akihiko Iwata, Tokyo (JP)

(73) Assignee: Mitsubishi Denki Kabushiki Kaisha, Tokyo (JP)

(\*) Notice: Subject to any disclaimer, the term of this patent is extended or adjusted under 35 U.S.C. 154(b) by 416 days.

(21) Appl. No.: 11/359,962

(22) Filed: Feb. 23, 2006

(65) Prior Publication Data

US 2007/0194627 A1    Aug. 23, 2007

(51) Int. Cl.
*H02J 1/00*    (2006.01)
(52) U.S. Cl. .............................. 307/63; 307/82; 307/105
(58) Field of Classification Search .................... 307/63, 307/82, 105
See application file for complete search history.

(56) References Cited

U.S. PATENT DOCUMENTS

| | | | | |
|---|---|---|---|---|
| 5,365,421 | A | * | 11/1994 | Eastman ....................... 363/71 |
| 5,949,668 | A | | 9/1999 | Schweighofer |
| 6,104,624 | A | * | 8/2000 | Iwamoto et al. ............... 363/71 |
| 6,621,719 | B2 | | 9/2003 | Steimer et al. |
| 6,812,592 | B2 | | 11/2004 | Iwata et al. |
| 6,956,305 | B2 | | 10/2005 | Iwata et al. |
| 7,230,837 | B1 | * | 6/2007 | Huang et al. .................. 363/71 |

FOREIGN PATENT DOCUMENTS

| | | |
|---|---|---|
| JP | 7-212977 A | 8/1995 |
| JP | 11-89242 A | 3/1999 |
| JP | 2002-359928 | 12/2002 |
| JP | 2002-359929 | 12/2002 |
| JP | 2004-64830 A | 2/2004 |
| JP | 2004-72864 A | 3/2004 |
| WO | WO 2005/041384 | 5/2005 |

OTHER PUBLICATIONS

Introduction To Power Electronics, Second Edition, Sakae Yamamura and Eiichi Ohno, pp. 264-269, Published by Ohmusha, Ltd.

\* cited by examiner

*Primary Examiner*—Shawn Riley
(74) *Attorney, Agent, or Firm*—Leydig, Voit & Mayer, Ltd.

(57) ABSTRACT

A power converting device includes a single-phase multiplex converter used as an active filter and a control device. The single-phase multiplex converter includes multiple single-phase inverters connected in series at AC output sides. Each of the single-phase inverters converts DC power fed from a DC power supply into AC power. The control device includes hysteresis comparators and controls output voltage of the single-phase multiplex converter by gradational output voltage control, based on the sum of selectively combined output voltages of the multiple single-phase inverters. The control device controls the single-phase multiplex converter so that an output current follows a harmonic compensation reference current, canceling harmonics leaking from a load to which the power converting device is connected.

15 Claims, 15 Drawing Sheets

FIG. 7

| | Y1 | Y2 | Y3 | Y4 | GRADATIONAL LEVEL CORRECTION VALUE (SOURCE VOLTAGE>0) −1 | | | | | GRADATIONAL LEVEL CORRECTION VALUE (SOURCE VOLTAGE<0) +2 | | | | |
|---|---|---|---|---|---|---|---|---|---|---|---|---|---|---|
| RANGE I ↑↓ | H | H | L | L | ← | ↑ | ← | ↑ | → | ← | ↑ | ← | ↑ | → |
| | | | | | 0 | | 0 | | −1 | −1 | | +1 | | −1 |
| RANGE II ↑↓ | L | H | L | L | ← | | ← | | → | ← | | ← | | → |
| | | | | | 0 | | 0 | | −1 | +1 | | +1 | | +2 |
| RANGE III ↑↓ | L | ← | L | L | ↑ 58 ↓ | | | | | ↑ 59 ↓ | | | | |
| | | | | | +2 | | +1 | | −1 | 0 | | 0 | | 0 |
| RANGE IV ↑↓ | L | L | H | L | ← | | ← | | → | ← | | ← | | → |
| | | | | | +2 | | +1 | | +1 | 0 | | 0 | | 0 |
| RANGE V | L | L | H | H | ← | ↓ | ← | ↓ | → | ← | ↓ | ← | ↓ | → |

WHEN OPERATED AS CONVERTER

WHEN OPERATED AS INVERTER

POWER CONVERTING DEVICE

BACKGROUND OF THE INVENTION

1. Field of the Invention

The present invention relates to a power converting device capable of controlling an output current. More particularly, the invention pertains to an active filter for suppressing harmonic current components which leak out of a load apparatus and flow to power supply side by injecting a harmonic compensation current for canceling the harmonic current components.

2. Description of the Background Art

An active filter is a device which generates a harmonic compensation current for suppressing harmonic currents produced by a load apparatus. Connected to a power supply line of the load apparatus at a point close thereto, the active filter injects the harmonic compensation current into the power supply line to cancel the harmonic currents leaking out of the load apparatus. A conventional active filter detects a load current, separates the load current into a fundamental component and harmonic components thereof, extracts only the harmonic current components of the load current, and generates a harmonic compensation current which is offset by 180 degrees in phase from the harmonic current components. The harmonic compensation current generated by the active filter is injected into the power supply line from a load connection point to cancel out the harmonic currents contained in the load current, whereby a source current is reshaped into a sine wave containing no harmonics. This kind of active filter typically employs as a current source a high-frequency pulse width modulation (PWM) inverter which is characterized by low loss, as described in a non-patent document "Introduction to Power Electronics, Second Edition," Sakae Yamamura and Eiichi Ohno, pp.264-269, published by Ohmsha, Ltd.

As the conventional active filter employs the high-frequency PWM inverter as mentioned above, the active filter has needed a large-scale filter circuit for suppressing leakage of harmonic currents to the power supply side, making it difficult to manufacture an active filter system in a compact structure.

SUMMARY OF THE INVENTION

In light of the aforementioned problem of the prior art, it is an object of the invention to provide a compactly built power converting device capable of controlling a current with high-speed and high precision, in which an output-side filter circuit has a considerably small size.

According to the invention, a power converting device which is connected to a load via a reactor to provide electric power to the load includes a single-phase multiplex converter configured by connecting a plurality of single-phase inverters in series at alternating current (AC) output side thereof, wherein each of the single-phase inverters converts direct current (DC) power fed from a DC power supply into AC power, and a control device for controlling the single-phase multiplex converter such that the single-phase multiplex converter produces an output voltage having a quasi-sinusoidal waveform simulated by the sum of output voltages of the individual single-phase inverters. The control device includes a basic gradational level calculator for calculating a basic gradational level of the output voltage of the single-phase multiplex converter based on a reference AC voltage, a gradational level correction value calculator for calculating a gradational level correction value used for correcting the basic gradational level, a gradational output voltage level calculator for calculating a gradational output voltage level for the single-phase multiplex converter by correcting the basic gradational level by the gradational level correction value, and an inverter control processor for outputting a control signal to the individual single-phase inverters in accordance with the gradational output voltage level. The gradational level correction value calculator calculates the gradational level correction value in such a manner that an output current of the single-phase multiplex converter follows a target current which is determined in accordance with the load.

In the power converting device thus structured, the output voltage of the single-phase multiplex converter is controlled by the sum of the output voltages of the individual single-phase inverters and the output current of the single-phase multiplex converter is controlled to follow the target current. It is therefore possible to obtain a power converting device featuring compact and simple design without requiring a large-scale filter circuit, yet allowing high-speed, high precision output current control.

These and other objects, features and advantages of the invention will become more apparent upon reading the following detailed description in conjunction with the accompanying drawings.

BRIEF DESCRIPTION OF THE DRAWINGS

FIG. 7 shows how gradational level correction values are calculated according to the first embodiment;

DETAILED DESCRIPTION OF THE PREFERRED EMBODIMENTS OF THE INVENTION

The invention is now described in detail with reference to the accompanying drawings.

First Embodiment

Figure 1:
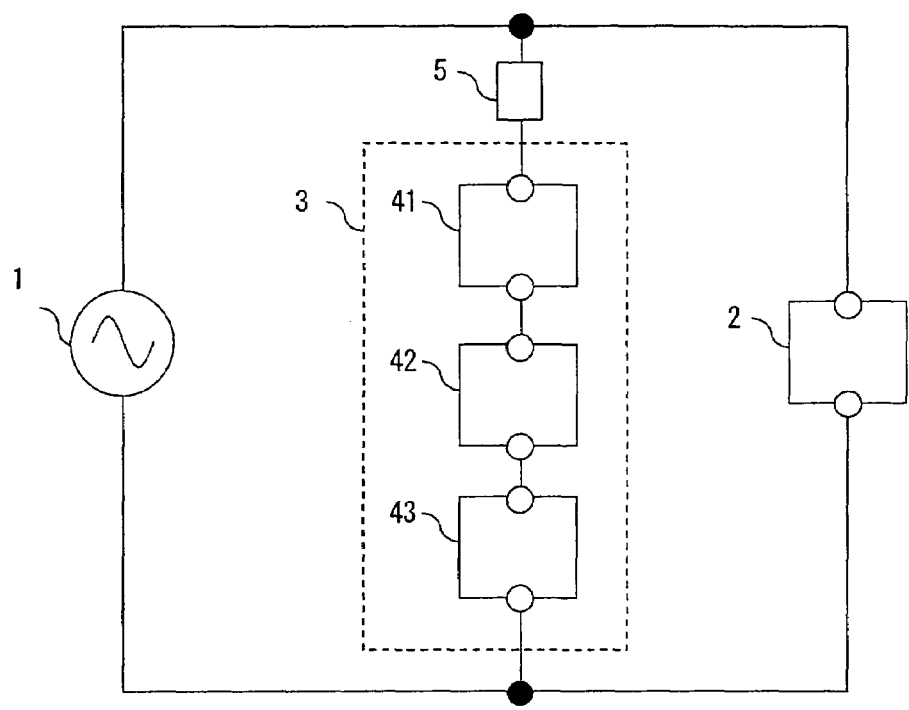
FIG. 1 is a block diagram showing the configuration of a main part of a power converting device according to a first embodiment of the invention.

FIG. 1 is a block diagram showing the configuration of a main part of a power converting device according to a first embodiment of the invention connected between a single-phase power supply 1 and a single-phase load 2 in parallel therewith, the power converting device being used as an active filter.

As shown in FIG. 1, the power converting device of the embodiment includes a single-phase multiplex converter, or a single-phase multiplex inverter 3, in which a plurality of (three in this embodiment) single-phase inverters 41-43 are connected in series. The single-phase multiplex inverter 3 is series-connected to a filter circuit 5 made up of a line reactor, and the single-phase multiplex inverter 3 and the line reactor are together connected to the single-phase power supply 1 in parallel therewith.

Figure 2:
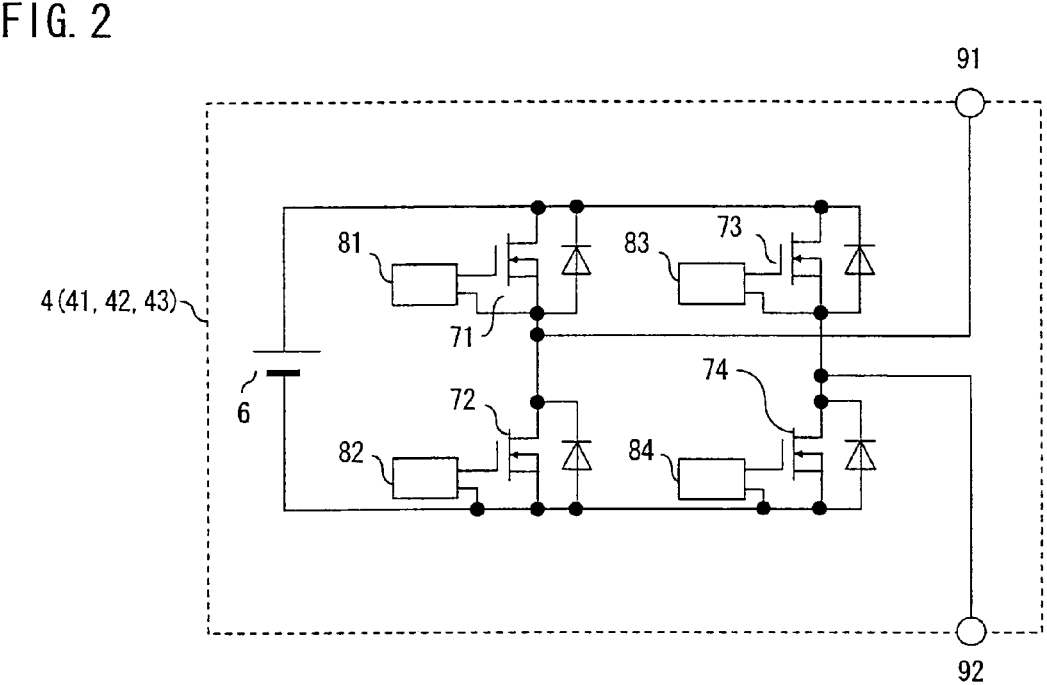
FIG. 2 is a circuit diagram showing the configuration of each single-phase inverter incorporated in the power converting device of the first embodiment.

FIG. 2 is a circuit diagram showing the configuration of each of the single-phase inverters 41-43 (hereinafter referred to collectively as the single-phase inverters 4) constituting the single-phase multiplex inverter 3 of FIG. 1. As shown in FIG. 2, each of the single-phase inverters 4 is, for example, a full-bridge inverter including a plurality of self-turn-off semiconductor switching devices 71-74, such as insulated-gate bipolar transistors (IGBTs) each of which is connected to a diode in reverse parallel directions. It is possible to use such devices as gate commutated turn-off (GCT) thyristors, gate turn-off (GTO) thyristors, transistors or metal-oxide-semiconductor field-effect transistors (MOSFETs) as the self-turn-off semiconductor-switching devices 71-74 instead of the IGBTs. Alternatively, thyristors having no self-turn-off function may be used as the switching devices 71-74 provided that those thyristors have a forced commutation capability.

The single-phase inverters 4 each have an independent DC power supply 6 and output terminals 91, 92 from which a voltage of the DC power supply 6 is output during a desired period of time, the DC power supply 6 being charged at a polarity shown in FIG. 2. More particularly, assuming that the DC power supply 6 provides a DC voltage of V, each single-phase inverter 4 can output a voltage chosen from voltage values −V, 0 and V from the output terminals 91, 92 as determined by a combination of on/off states of the individual switching devices 71-74. Gate drive circuits 81-84 provided in each single-phase inverter 4 are circuits which apply a specific voltage across a gate and a source of each of the switching devices 71-74 for turning on or off the switching devices 71-74. Each of the gate drive circuits 81-84 is a pulse-transformer circuit or a photocoupler circuit, for example, for providing electrical isolation required between a control circuit and a power circuit.

The single-phase multiplex inverter 3 is configured by connecting the above-described single-phase inverters 41-43 in series at AC output side thereof. The voltages provided by the DC power supplies 6 of the individual single-phase inverters 41-43 differ from one another. Representing the DC output voltages of the single-phase inverters 41, 42 and 43 by V1, V2 and V3, respectively, the single-phase multiplex inverter 3 outputs from output terminals thereof the sum of the DC output voltages of the individual single-phase inverters 4, wherein the output voltage of the single-phase multiplex inverter 3 is determined by a combination of the output voltages of the individual single-phase inverters 4. Specifically, assuming that there is a relationship expressed by V1:V2:V3=1:3:9 among the DC output voltages of the single-phase inverters 4, the single-phase multiplex inverter 3 can selectively output 27 different levels of DC voltages for a desired period of time by changing the combination of the output voltages of the single-phase inverters 4. To be more specific, the 27 different DC voltages that the single-phase multiplex inverter 3 can output 27 different DC voltage levels represented by numerical (gradational) values −13, −12, −11, −10, −9, −8, −7, −6, −5, −4, −3, −2, −1, 0, 1, 2, 3, 4, 5, 6, 7, 8, 9, 10, 11, 12 and 13.

Accordingly, if the DC output voltages of the individual single-phase inverters 41-43 are properly selected by a later-described control device which is connected to the single-phase multiplex inverter 3 to vary the output voltage of the single-phase multiplex inverter 3 in small incremental steps, an output voltage having a desired stepped waveform can be obtained from the single-phase multiplex inverter 3. It follows that the single-phase multiplex inverter 3 can produce together with the filter circuit 5 connected in series therewith an AC output voltage closely imitating a smooth sine wave even if the filter circuit 5 is a small-scale one. This technique of controlling the output voltage of the single-phase multiplex inverter 3 to create a desired waveform by combining multiple DC voltages is hereinafter referred to as "gradational output voltage control."

A capacitor-input type rectifying circuit is a typical example of a load which generates harmonics. If the load 2 connected to the single-phase power supply 1 is this kind of load, a current containing harmonic components having a large peak current magnitude flows from the load 2 to power supply side. The current containing harmonic components causes a voltage drop due to power line impedance and consequent source voltage distortion, eventually leading to such failures as burnout of a phase advancing capacitor in the case of a high-capacity system or malfunction of a circuit breaker in the case of a low-capacity system.

In the active filter employing the power converting device thus structured, the single-phase multiplex inverter 3 generates a harmonic compensation current for compensating for harmonic current components produced by the load 2 and suppresses the current containing the harmonic components leaking to the power supply side so that a line current would be a substantially sinusoidal current free from the harmonic components.

Operation of the power converting device of the present embodiment for generating the harmonic compensation current by the aforementioned gradational output voltage control is now described.

Figure 3:
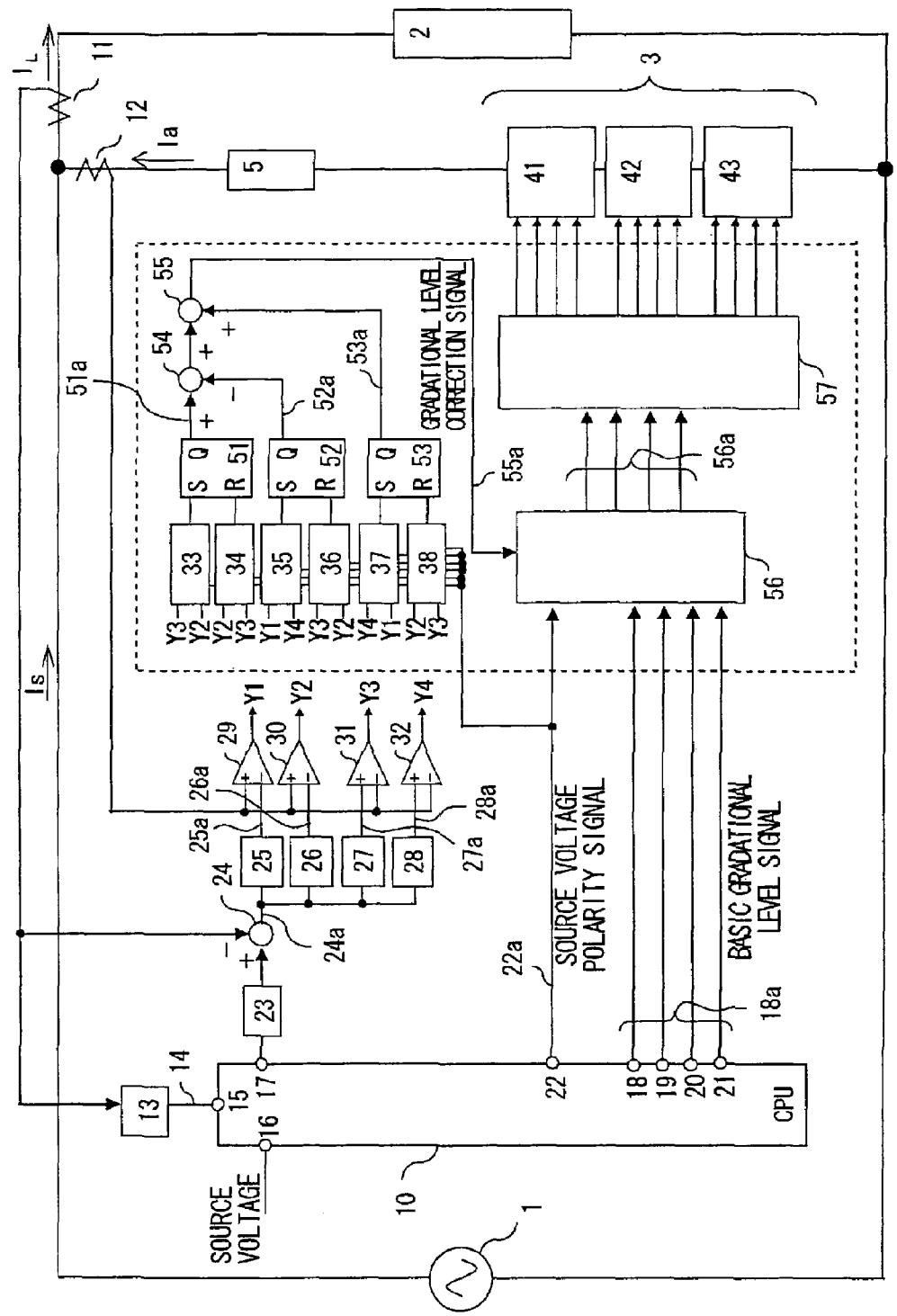
FIG. 3 is a detailed circuit diagram showing the configuration of the power converting device according to the first embodiment of the invention.

FIG. 3 is a detailed configuration diagram of the power converting device provided with the aforementioned control device for driving the single-phase multiplex inverter 3. The control device includes a central processing unit (CPU) 10 serving as a basic gradational level calculator for calculating a basic gradational level of the output voltage of the single-phase multiplex inverter 3 based on a source voltage which is used as a reference AC voltage and outputting a basic gradational level signal 18a, and peripheral circuits of the CPU 10. Included in the peripheral circuits are a gradational level correction value calculator for calculating a gradational level correction value used for correcting the basic gradational level (i.e., the basic gradational level signal 18a) and outputting a gradational level correction signal 55a, a gradational output voltage level calculating circuit 56 for calculating a gradational output voltage level command 56a for the single-phase multiplex inverter 3 by correcting the basic gradational level by the gradational level correction value (i.e., the gradational level correction signal 55a), and an inverter control processing circuit 57 for outputting control signals to the individual single-phase inverters 41-43 according to the gradational output voltage level command 56a.

The aforementioned gradational level correction value calculator is for outputting the gradational level correction signal 55a such that an output current of the single-phase multiplex inverter 3 (hereinafter referred to as the inverter current $I_a$) follows a harmonic compensation reference current 24a which is a target current calculated from a load current $I_L$. Referring to FIG. 3, the gradational level correction value calculator includes level shift circuits 25-28, comparators 29-32 serving as hysteresis comparators, multiplexers 33-38, flip-flops 51-53, a subtracter 54 and an adder 55.

The load current $I_L$ which is detected by a current sensor 11 is passed through a bandpass filter 13, which removes harmonic components contained in the load current $I_L$ and extracts a fundamental component thereof. The bandpass filter 13 outputs the fundamental component of the load current $I_L$ to the CPU 10 through an input terminal 15 thereof. Also, source voltage detected by a voltage sensor (not shown) is delivered to the CPU 10 through an input terminal 16 thereof. These inputs are converted from analog values to digital values by an internal analog-to-digital (A/D) converter of the CPU 10 and digital data thus obtained are subjected to subsequent signal processing. The CPU 10 outputs a discrete load current fundamental component value from an output terminal 17 thereof through a digital-to-analog (D/A) converter. As it is necessary for the single-phase multiplex inverter 3 to output a voltage synchronized with the source voltage, the CPU 10 produces a stepped waveform from source voltage values detected by the A/D converter and outputs the basic gradational level signal 18a representing the stepped waveform in the form of 4-bit binary data through output terminals 18-21. At the same time the CPU 10 outputs a source voltage polarity signal 22a through an output terminal 22.

Figure 4:
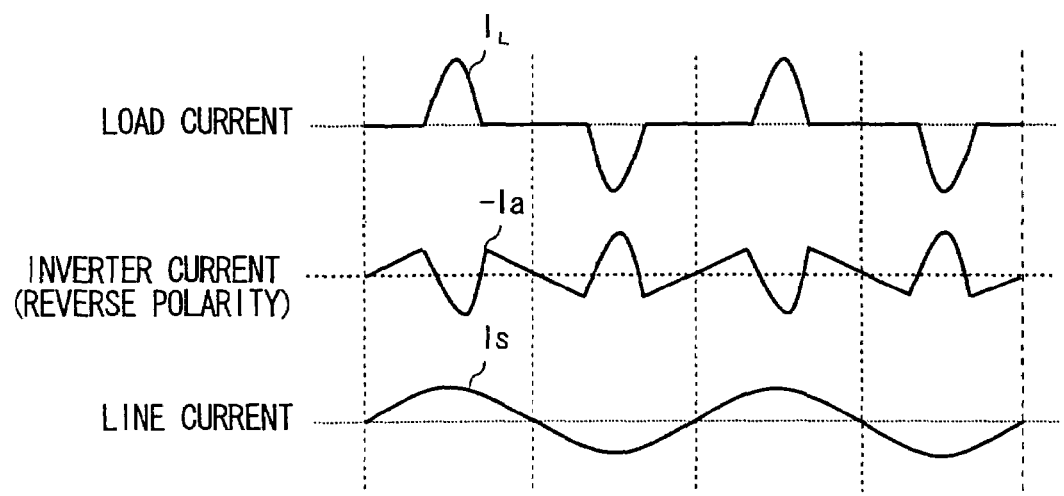
FIG. 4 is a waveform diagram generally illustrating operation of the power converting device of the first embodiment.

The discrete load current fundamental component value output from the output terminal 17 of the CPU 10 is smoothed by a filter 23, and a subtracter 24 subtracts the load current $I_L$ from the smoothed load current fundamental component value to generate the aforementioned harmonic compensation reference current 24a which is the target current to be fed into the single-phase multiplex inverter 3. The inverter current $I_a$ output from the single-phase multiplex inverter 3 is controlled to follow the harmonic compensation reference current 24a thus generated, whereby the harmonic components of the load current $I_L$ are canceled out by the inverter current $I_a$ and a sinusoidal line current $I_s$ is obtained as shown in FIG. 4.

Discussed below is how the inverter current $I_a$ is controlled. FIG. 4 is a waveform diagram generally illustrating the operation of the power converting device and FIG. 5 is a diagram showing an enlarged waveform of the inverter current $I_a$.

Figure 5:
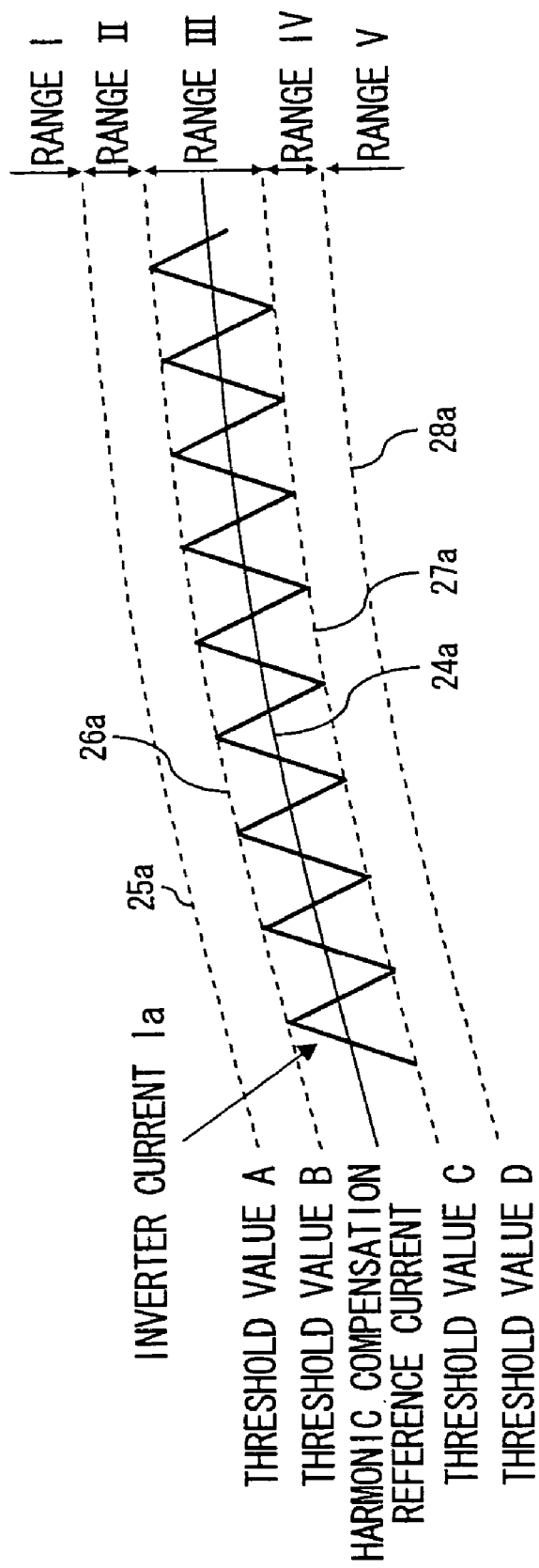
FIG. 5 is an enlarged view of the waveform of an inverter current shown in FIG. 4.

As illustrated in FIG. 3, the level shift circuits 25-28 set four threshold values 25a-28a (referred to also as threshold values A-D) shown in FIG. 5 based on the harmonic compensation reference current 24a generated as mentioned above. Referring to FIG. 5, a current range beyond the threshold value A is referred to as a range I, a current range between the threshold value A and the threshold value B is referred to as a range II, a current range between the threshold value B and the threshold value C is referred to as a range III, a current range between the threshold value C and the threshold value D is referred to as a range IV, and a current range below the threshold value D is referred to as a range V.

Figure 6:
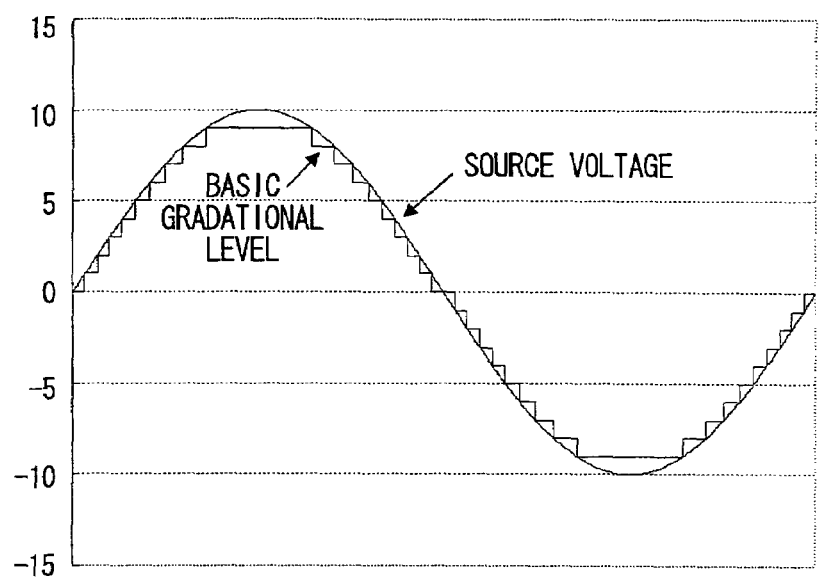
FIG. 6 is a diagram showing a relationship between basic gradational levels and source voltage according to the first embodiment.

To control the inverter current $I_a$ of the single-phase multiplex inverter 3, the gradational output voltage level command 56a for setting the output voltage of the single-phase multiplex inverter 3 is determined by the hysteresis comparators 30 and 31 in such a manner that the inverter current $I_a$ goes up and down within the range III, or between the threshold value B and the threshold value C, as shown in FIG. 5. In this embodiment, the gradational output voltage level command 56a is determined by adding 0 or +1 as the gradational level correction value (defined by the gradational level correction signal 55a) to basic gradational levels defined by the basic gradational level signal 18a output from the CPU 10, where the basic gradational levels successively defined by the basic gradational level signal 18a output from the CPU 10 are absolute values of integral parts of voltage values which form a stepwise waveform inscribed in each half-wave portion of the sinusoidal source voltage as illustrated in FIG. 6. With this arrangement, when the polarity of the source voltage is positive, it is possible to decrease the inverter current $I_a$ by setting the gradational level correction value 55a to 0 and increase the inverter current $I_a$ by setting the gradational level correction value 55a to +1. When the polarity of the source voltage is negative, on the other hand, it is-possible to increase the inverter current $I_a$ by setting the gradational level correction value 55a to 0 and decrease the inverter current $I_a$ by setting the gradational level correction value 55a to +1.

The aforementioned method of determining the gradational level correction value 55a is further described below with reference to FIG. 3. The hysteresis comparators 29-32 compare the inverter current $I_a$ detected by a current sensor 12 with the four threshold values 25a-28a (i.e., the threshold values A-D) and provide output signals Y1, Y2, Y3 and Y4, respectively. FIG. 7 shows values of the output signals Y1-Y4 of the respective hysteresis comparators 29-32 and the gradational level correction values in the regions I, II, III, IV, V. The comparator outputs Y1-Y4 are input into the multiplexers 33-38 as shown in FIG. 3. Output signals of the multiplexers 33-38 are switched depending on the polarity of the source voltage indicated by the source voltage polarity signal 22a which is also input into the multiplexers 33-38. Specifically, when the polarity of the source voltage is positive, the multiplexers 33-38 output inputs thereof (i.e., the comparator outputs Y3, Y2, Y1, Y3, Y4, Y2) shown on an upper side in FIG. 3, and when the polarity of the source voltage is negative, the multiplexers 33-38 output inputs thereof (i.e., the comparator outputs Y2, Y3, Y4, Y2, Y1, Y3) shown on a lower side in FIG. 3. The output signals of the multiplexers 33-38 are input into the flip-flops 51-53. The flip-flops 51-53 are reset-set (or R-S) flip-flops. The gradational level correction value 55a is obtained when output signals of the flip-flops 51-53 are passed through the subtracter 54 and the adder 55. A circuit enclosed by broken lines in FIG. 3 can be configured by a programmable logic device (PLD), for example.

Figure 8:
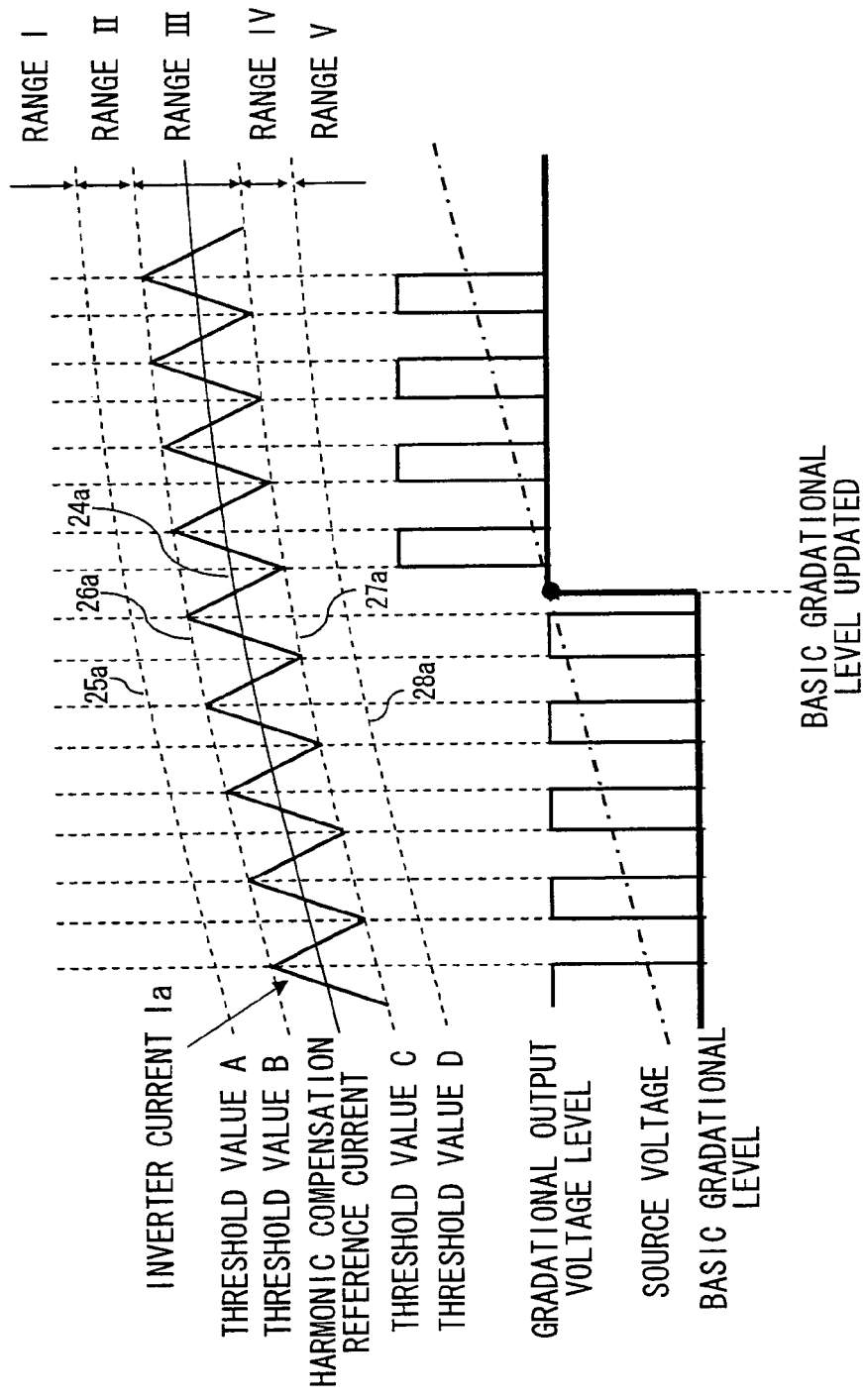
FIG. 8 is a diagram showing a relationship between the inverter current and output voltage under normal operating conditions.

Referring to FIGS. 7 and 8, operation of the aforementioned gradational level correction value calculator is explained more specifically using an example in which the polarity of the source voltage is positive. FIG. 8 is a diagram showing a relationship between the inverter current $I_a$ and the output voltage of the single-phase multiplex inverter 3 (or the gradational output voltage level command 56a) under normal operating conditions where the basic gradational level signal 18a output from the CPU 10 is not delayed by source voltage sampling operation.

Controlled by the source voltage polarity signal 22a entered from the CPU 10, the multiplexers 33-38 output the inputs thereof (i.e., the comparator outputs Y3, Y2, Y1, Y3, Y4, Y2) shown on the upper side in FIG. 3 as mentioned above. When the inverter current $I_a$ decreases and transfers from the range III to the range IV, the output signal Y3 of the hysteresis comparator 31 changes from a low (L) level to a high (H) level and the multiplexer 33 outputs an H signal. This output of the multiplexer 33 is input into the flip-flop 51 from a set terminal thereof and the flip-flop 51 outputs the H signal from an output terminal (Q) thereof. At this point, the flip-flop 51 outputs a gradational level correction value 51a of +1. The signals output from the other two flip-flops 52, 53 are both at the L level. The gradational level correction value 55a derived from these outputs of the flip-flops 51-53 through the subtracter 54 and the adder 55 becomes equal to the gradational level correction value 51a of +1 in this case.

As a result of the above-described correction by one gradational level, the inverter current $I_a$ which has decreased begins to increase. While the inverter current $I_a$ is within the range III, the set terminal and a reset terminal of the flip-flop 51 are both at the L level, so that the output signal of the flip-flop 51 is maintained at the H level and the gradational level correction value 51a remains +1 to successively increase the inverter current $I_a$ by one gradational level. When the inverter current $I_a$ increasing in incremental steps transfers from the range III to the range II, the output signal Y2 of the hysteresis comparator 30 changes from the L level to the H level and, as a consequence, the multiplexer 34 outputs an H signal. This output of the multiplexer 34 is input into the flip-flop 51 from the reset terminal thereof and the flip-flop 51 outputs an L signal from the output terminal (Q) thereof. At this point, the gradational level correction value 51a output from the flip-flop 51 becomes 0. The signals output from the other two flip-flops 52, 53 are both at the L level. The gradational level correction value 55a derived from these outputs of the flip-flops 51-53 through the subtracter 54 and the adder 55 becomes equal to the gradational level correction value 51a of 0 in this case.

When the gradational level correction value 55a becomes 0, the inverter current $I_a$ decreases. Consequently, the inverter current $I_a$ decreases to a level within the range III and both the set terminal and the reset terminal of the flip-flop 51 become the L level, so that the output signal of the flip-flop 51 remains unchanged and the gradational level correction value 55a is held at 0, and the inverter current $I_a$ continues to decrease until it goes into the range IV. Subsequently, the gradational level correction value 55a becomes +1 in the same way as described above and the inverter current $I_a$ begins to increase again.

As discussed above, the gradational level correction value 55a varies as indicated by an arrow 58 in FIG. 7 to generate the gradational output voltage level command 56a by alternately adding 0 or +1 as the gradational level correction value 55a to the basic gradational level 18a, so that the inverter current $I_a$ goes up and down within the range III, or between the threshold value B and the threshold value C, in a controlled fashion as shown in FIG. 8. To be more specific, when the inverter current $I_a$ increases to a level beyond the threshold value B, the gradational level correction value 55a is set to 0 to decrease the inverter current $I_a$, and the inverter current $I_a$ decreases to a level below the threshold value C, the gradational level correction value 55a is set to +1 to increase the inverter current $I_a$. Since the threshold values A-D are calculated based on the harmonic compensation reference current 24a generated at any given point in time, the inverter current $I_a$ is controlled to follow the harmonic compensation reference current 24a.

When the polarity of the source voltage is negative, on the other hand, the aforementioned gradational level correction value calculator operates as described below. Controlled by the source voltage-polarity signal 22a entered from the CPU 10, the multiplexers 33-38 output the inputs thereof (i.e., the comparator outputs Y2, Y3, Y4, Y2, Y1, Y3) shown on the lower side in FIG. 3 as mentioned above. When the inverter current $I_a$ decreases and transfers from the range III to the range IV, the output signal Y3 of the hysteresis comparator 31 changes from the L level to the H level and the multiplexer 34 outputs the H signal. This output of the multiplexer 34 is input into the flip-flop 51 from the reset terminal thereof and the flip-flop 51 outputs the L signal from the output terminal (Q) thereof. At this point, the gradational level correction value 51a output from the flip-flop 51 becomes 0. The signals output from the other two flip-flops 52, 53 are both at the L level. The gradational level correction value 55a derived from these outputs of the flip-flops 51-53 through the subtracter 54 and the adder 55 becomes equal to the gradational level correction value 51a of 0 in this case.

When the gradational level correction value 55a becomes 0, the inverter current $I_a$ increases. While the inverter current $I_a$ is within the range III, both the set terminal and the reset terminal of the flip-flop 51 are at the L level., Thus, the output signal of the flip-flop 51 is maintained at the L level and the gradational level correction value 55a remains 0, so that the inverter current $I_a$ continues to increase. When the inverter current $I_a$ transfers from the range III to the range II, the output signal Y2 of the hysteresis comparator 30 changes from the L level to the H level and; as a consequence, the multiplexer 33 outputs the H signal. This output of the multiplexer 33 is input into the flip-flop 51 from the set terminal thereof and the flip-flop 51 outputs the H signal from the output terminal (Q) thereof. At this point, the flip-flop 51 outputs the gradational level correction value 51a of +1. The signals output from the other two flip-flops 52, 53 are both at the L level. The gradational level correction value 55a derived from these outputs of the flip-flops 51-53 through the subtracter 54 and the adder 55 becomes equal to the gradational level correction value 51a of +1 in this case.

When the gradational level correction value 55a becomes +1, the inverter current $I_a$ decreases. Consequently, the inverter current $I_a$ decreases to a level within the range III and both the set terminal and the reset terminal of the flip-flop 51 become the H level, so that the output signal of the flip-flop 51 remains unchanged and the gradational level correction value 55a is held at +1, and the inverter current $I_a$ continues to decrease until it goes into the range IV. Subsequently, the gradational level correction value 55a becomes +1 in the same way as described above and the inverter current $I_a$ begins to increase again.

As discussed above, the gradational level correction value 55a varies as indicated by an arrow 59 in FIG. 7 to generate the gradational output voltage level command 56a by alternately adding 0 or +1 as the gradational level correction value 55a to the basic gradational level 18a, so that the inverter current $I_a$ goes up and down within the range III, or between the threshold value B and the threshold value C, in a controlled fashion.

If the basic gradational level 18a output from the CPU 10 has a wrong value due to a delay caused by the influence of source voltage sampling intervals of-the internal A/D converter, the inverter current $I_a$ goes out of the range III into the range II or into the range IV even if the above-described gradational level correction is made. Control operation performed when there is a delay in output timing of the basic gradational level 18a is described below.

Figure 9:
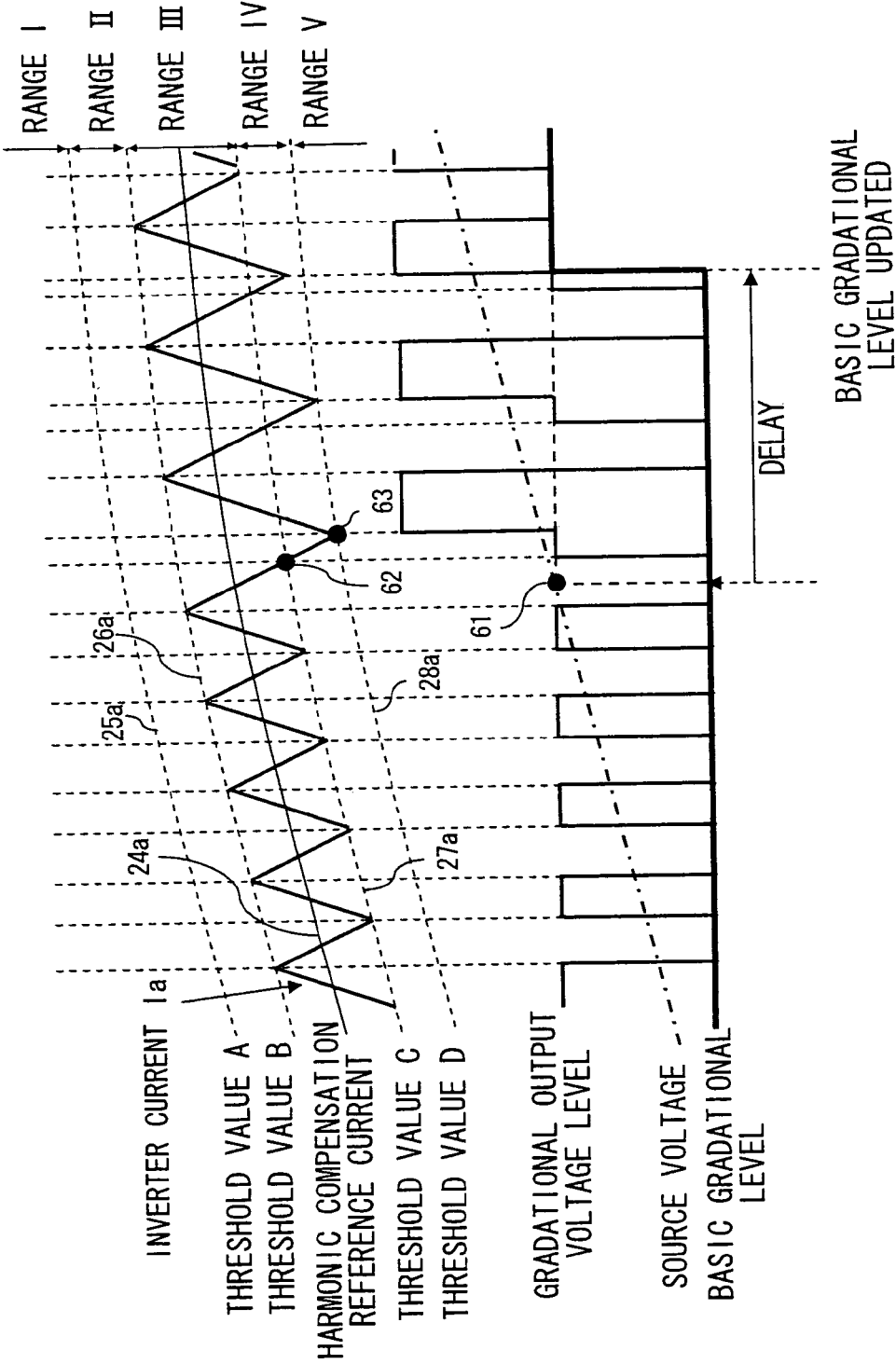
FIG. 9 is a diagram showing the relationship between the inverter current and the output voltage when there is a delay in source voltage sampling operation.

When the inverter current $I_a$ transfers from the range III to the range IV while the polarity of the source voltage is positive, the gradational level correction value 55a becomes +1 as already explained. In this case, one gradational level is added to the basic gradational level 18a output from the CPU 10. If a delay in the source voltage sampling operation occurs when the rate of change of the source voltage is positive, however, there can occur a situation where the value of the basic gradational level 18a is insufficient. FIG. 9 is a diagram showing the relationship between the inverter current $I_a$ and the output voltage of the single-phase multiplex inverter 3 (or the gradational output voltage level command 56a) in such a situation.

As shown in FIG. 9, basic gradational level update timing is delayed when the rate of change of the source voltage is positive. Thus, during a period of delayed basic gradational level update from a point in time 61 when the basic gradational level should be updated, the inverter current $I_a$ continues to decrease even if the gradational level correction value 55a is set to +1 at a point in time 62 when the inverter current $I_a$ becomes lower than the threshold value C, because the gradational output voltage level command 56a is lower than the source voltage during this period. Then, at a point in time 63 when the inverter current $I_a$ just becomes lower than the threshold value D, or when the inverter current $I_a$ transfers from the range IV to the range V, the hysteresis comparator 32 outputs an H signal and the multiplexer 37 outputs the H signal. This output of the multiplexer 37 is input into the flip-flop 53 from a set terminal thereof and the flip-flop 51 outputs the H signal from an output terminal (Q) thereof. This H signal output from the flip-flop 53 is a gradational level deviation correction value 53a for compensating for an output delay of the basic gradational level 18a from the CPU 10 and is added to the gradational level correction value 51a by the adder 55. As the gradational level deviation correction value 53a (+1) is added to the gradational level correction value 51a (+1) in this case, the resultant gradational level correction value 55a becomes +2.

Subsequently, the inverter current $I_a$ begins to increase again and, as the inverter current $I_a$ transfers from the range V to the range IV, the multiplexer 37 outputs an L signal. Since the set terminal and a reset terminal of the flip-flop 53 are both at the L level at this point, the output signal of the flip-flop 53 remains unchanged and the gradational level correction value 55a is held at +2, so that the inverter current $I_a$ continues to increase. When the inverter current $I_a$ transfers from the range IV to the range III, the output signal Y3 of the hysteresis comparator 31 changes from the H level to the L level. Since the set terminal and a reset terminal of the flip-flop 53 are both at the L level at this point, the output signal of the flip-flop 53 remains unchanged and the gradational level correction value 55a is held at +2, and the inverter current $I_a$ continues to increase until it goes into the range II. When the inverter current $I_a$ transfers from the range III to the range II, the output signal Y2 of the hysteresis comparator 30 changes from the L level to the H level and, as a consequence, the multiplexer 34 and 38 output H signals. The outputs of the multiplexer 34 and 38 are input into the flip-flop 51 and 53, respectively, from the reset terminals thereof and both the flip-flop 51 and 53 output the L signals from the respective output terminals (Q). As the gradational level deviation correction value 53a (0) is added to the gradational level correction value 51a (0), the resultant gradational level correction value 55a becomes 0. Subsequently, the inverter current $I_a$ begins to decrease again and the basic gradational level is corrected by the above-described manner until the corrected basic gradational level becomes a correct value.

Figure 10:
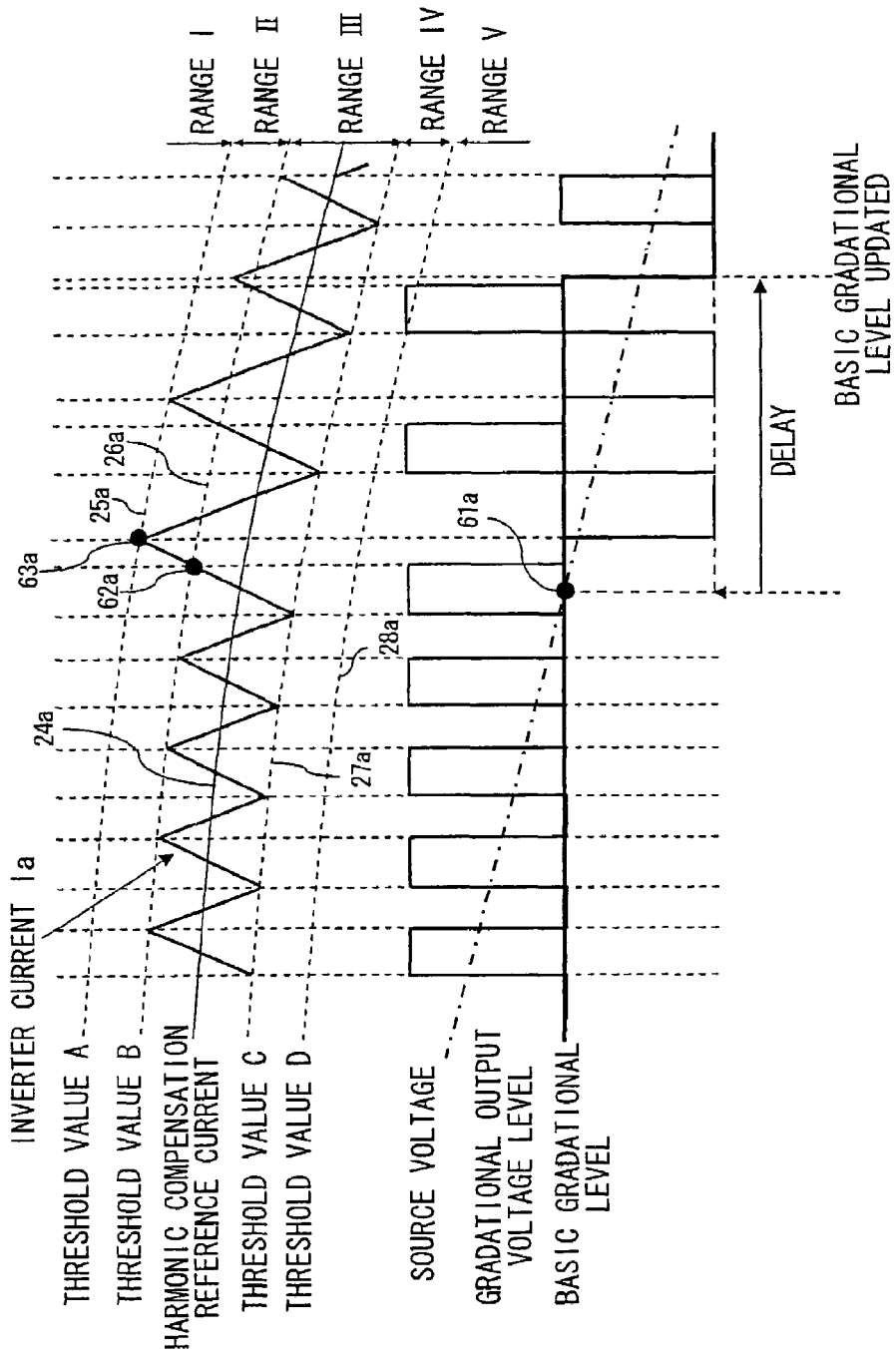
FIG. 10 is also a diagram showing the relationship between the inverter current and the output voltage when there is a delay in source voltage sampling operation.

If a delay in the source voltage sampling operation occurs when the polarity of the source voltage is positive and the rate of change of the source voltage is negative, the basic gradational level defined by the basic gradational level signal 18a output from the CPU 10 may be one gradational level higher than a correct basic gradational level. This is because the basic gradational levels successively defined by the basic gradational level signal 18a output from the CPU 10 are integral parts of voltage values which form a stepwise waveform inscribed in each half-wave portion of the sinusoidal source voltage. FIG. 10 is a diagram showing the relationship between the inverter current $I_a$ and the output voltage of the single-phase multiplex inverter 3 (or the gradational output voltage level command 56a) in this situation.

As shown in FIG. 10, the basic gradational level update timing is delayed when the rate of change of the source voltage is negative. Thus, during a period of delayed basic gradational level update from a point in time 61a when the basic gradational level should be updated, the inverter current $I_a$ continues to increase even if the gradational level correction value 55a is set to 0 at a point in time 62a when the inverter current $I_a$ exceeds the threshold value B, because the gradational output voltage level command 56a is higher than the source voltage during this period. Then, at a point in time 63a when the inverter current $I_a$ just exceeds the threshold value A, or when the inverter current $I_a$ transfers from the range II to the range I, the hysteresis comparator 29 outputs an H signal and the multiplexer 35 outputs the H signal. This output of the multiplexer 35 is input into the flip-flop 52 from a set terminal thereof and the flip-flop 52 outputs the H signal from an output terminal (Q) thereof. This H signal output from the flip-flop 52 is a gradational level deviation correction value 52a for compensating for an output delay of the basic gradational level 18a from the CPUF 10 and is subtracted from the gradational level correction value 51a by the subtracter 54. As the gradational level deviation correction value 52a (+1) is subtracted from the gradational level correction value 51a (0) in this case, the resultant gradational level correction value 55a becomes −1.

Subsequently, the inverter current $I_a$ which has increased begins to decrease, and the inverter current $I_a$ transfers from the range I back to the range II. While the inverter current $I_a$ is within the range II, the set terminal and a reset terminal of the flip-flop 52 are both at the L level. Thus, the output signal of the flip-flop 52 remains at the H level and the gradational level correction value 55a is held at −1, so that the inverter current $I_a$ continues to decrease. When the inverter current $I_a$ transfers from the range II to the range III, the output signal Y2 of the hysteresis comparator 30 changes from the H level to the L level. Since the set and reset terminals of both the flip-flop 51 and the flip-flop 53 are all at the L level, the output signals thereof are held at the L level and the gradational level correction value 55a remains −1, so that the inverter current $I_a$ continues to decrease. When the inverter current $I_a$ transfers from the range III to the range IV, the output signal Y3 of the hysteresis comparator 31 changes from the L level to the H level and the multiplexer 33 outputs the H signal. This output of the multiplexer 33 is input into the flip-flop 51 from the set terminal thereof and the flip-flop 51 outputs the H signal from the output terminal (Q) thereof. Further, the multiplexer 36 outputs an H signal into the flip-flop 52 from the reset terminal thereof. As the gradational level deviation correction value 52a (0) is subtracted from the gradational level correction value 51a (+1) in this case, the resultant gradational level correction value 55a becomes −1.

Then, the gradational level correction is made in the same way as described above so that the inverter current $I_a$ increases and decreases within the range III thereafter.

The gradational level correction value 55a determined as thus far explained is fed into the gradational output voltage level calculating circuit 56 which is a digital circuit provided outside the CPU 10. The gradational output voltage level calculating circuit 56 adds the gradational level correction value 55a to the basic gradational level 18a to produce the gradational output voltage level command 56a. The gradational output voltage level command 56a is fed into the inverter control processing circuit 57 which generates and outputs the control signals to the single-phase inverters 41-43 of each single-phase inverter 4. The inverter control processing circuit 57 can be configured by a programmable logic device (PLD), for example.

As thus far described, the active filter, or the power converting device, of the first embodiment employs the single-phase multiplex inverter 3 including the plurality of series-connected single-phase inverters 41-43, of which output voltages V1, V2, V3 are selected as appropriate to obtain an output voltage having a desired stepped waveform for controlling the inverter current $I_a$ by the aforementioned gradational output voltage control operation. This configuration makes it possible to considerably reduce the size of the filter circuit 5 and provide a compactly built power converting device.

To control the single-phase multiplex inverter 3 such that the inverter current $I_a$ follows the harmonic compensation reference current 24a, the aforementioned control device of the embodiment includes the basic gradational level calculator for outputting the basic gradational level 18a of the output voltage of the single-phase multiplex inverter 3 based on the source voltage, the gradational level correction value calculator for outputting the gradational level correction signal 55a, the gradational output voltage level calculating circuit 56 for calculating the gradational output voltage level command 56a, and the inverter control processing circuit 57 for outputting the control signals to the individual single-phase inverters 41-43, wherein only the basic gradational level calculator is configured by the CPU 10 while the other circuits are peripheral circuits of the CPU 10. This configuration makes it possible to alleviate work load on the CPU 10 so that the CPU 10 may be an inexpensive one, thereof allowing cost reduction of the control device. Also, as the gradational level correction value calculator for outputting the gradational level correction signal 55a employs the hysteresis comparators 29-32, the gradational level correction value calculator can control the single-phase multiplex inverter 3 such that the inverter current $I_a$ follows the harmonic compensation reference current 24a with high speed and high precision. Furthermore, since the control device is configured to have the capability to compensate for an output delay of the basic gradational level 18a output from the CPU 10 by calculating the gradational level deviation correction values 52a, 53a even if the source voltage sampling intervals are relatively large, it is possible to perform harmonic suppression control operation with high speed and high precision even if the CPU 10 is an inexpensive one.

Figure 11:
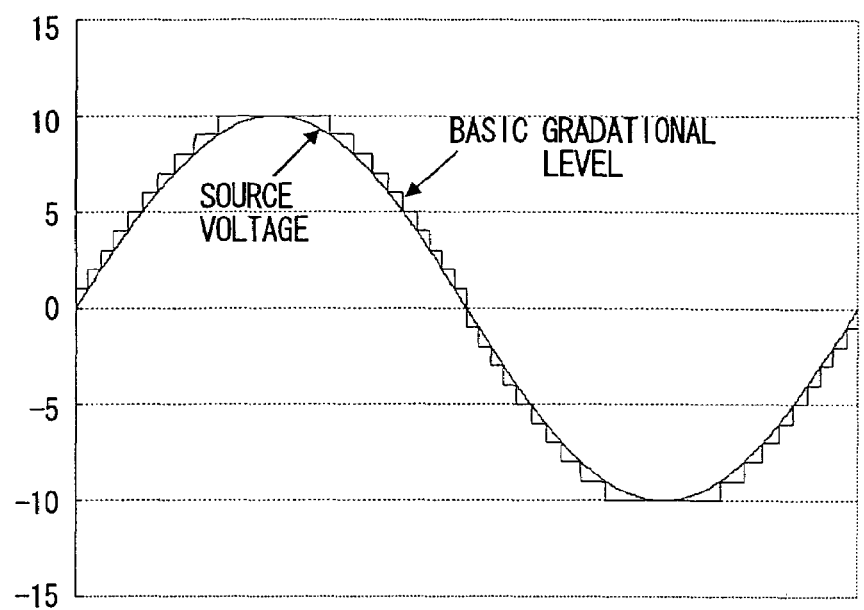
FIG. 11 is a diagram showing a relationship between basic gradational levels and source voltage according to one variation of the first embodiment.

Although the basic gradational levels successively defined by the basic gradational level signal 18a output from the CPU 10 are integral parts of voltage values which form a stepwise waveform inscribed in each half-wave portion of the sinusoidal source voltage in the foregoing first embodiment, the embodiment may be modified such that the basic gradational levels successively defined by the basic gradational level signal 18a form a stepwise waveform circumscribed about each half-wave portion of the sinusoidal source voltage as illustrated in FIG. 11. In this modified form of the first embodiment, the value 1 should be subtracted from the gradational level correction value 55a used in the above-described first embodiment to obtain a gradational level correction value. As the CPU 10 outputs basic gradational levels 18a which form a stepwise waveform inscribed in or circumscribed about each half-wave portion of the sinusoidal source voltage as described above, it is possible to calculate the gradational level correction value 55a with ease and control the single-phase multiplex inverter 3 such that the inverter current $I_a$ follows the harmonic compensation reference current 24a with ease and high reliability.

The level shift circuits 25-28 set the threshold values 25a-28a for the hysteresis comparators 29-32 in such a way that ripple components contained in the line current Is fall within a permissible range. While increments of the threshold values 25a-28a fed into the hysteresis comparators 29-32 are to be reduced for decreasing ripple currents, this approach results in an increase in operating frequency of the switching devices 71-74. This means that there is a trade-off between current controlling accuracy and switching frequency. Therefore, the increments of the threshold values 25a-28a fed into the hysteresis comparators 29-32 are determined based on a voltage value corresponding to one gradational level change and maximum switching frequency of the switching devices 71-74 constituting each of the single-phase inverters 4. Since the rate of change in the line current $I_s$ varies with power supply impedance and the magnitude of reactance introduced by the filter circuit 5, the line reactor of the filter circuit 5, or the filter reactor, is designed in such a fashion that the ripple currents contained in the line current $I_s$ fall within the permissible range.

Second Embodiment

Figure 12:
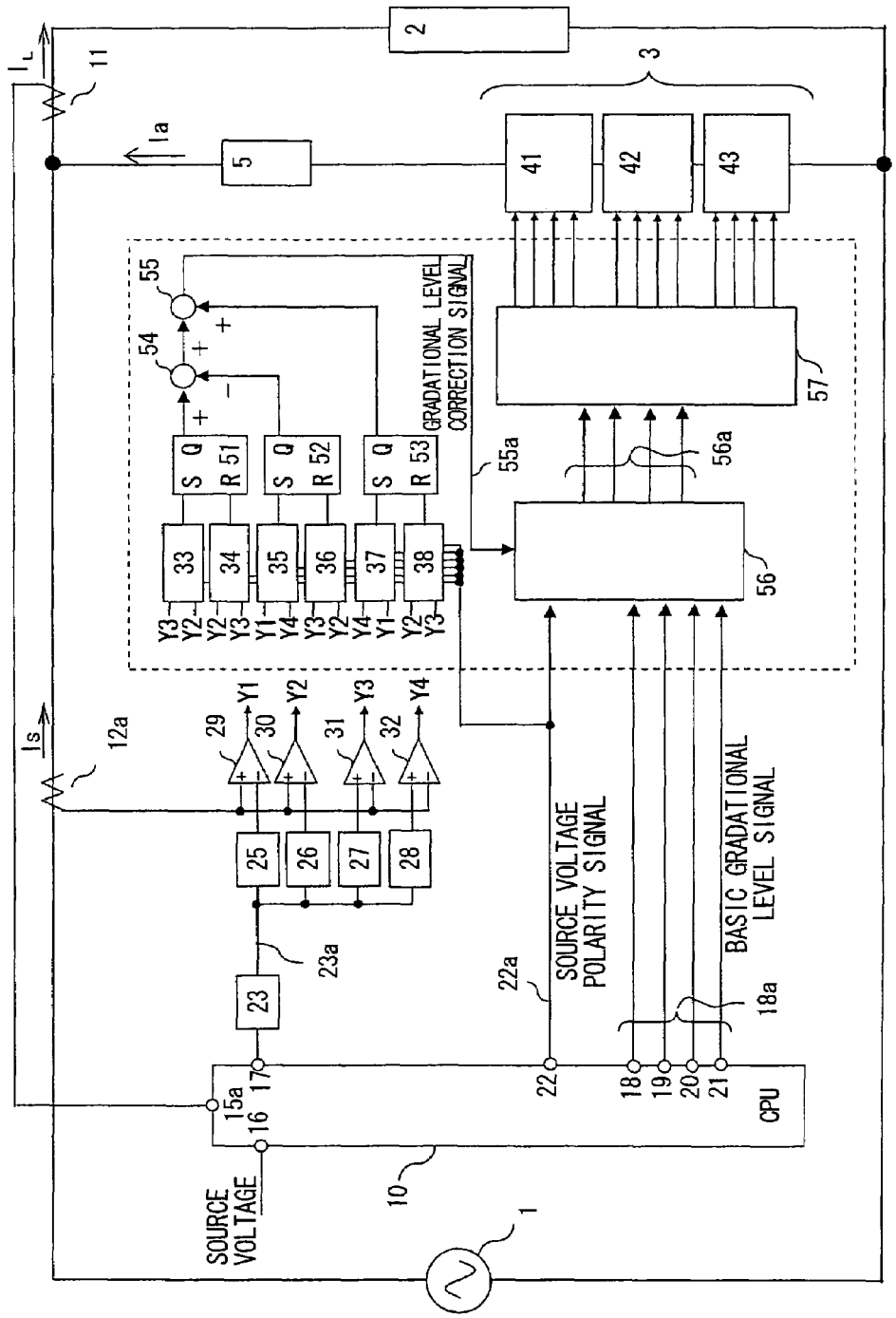
FIG. 12 is a detailed circuit diagram showing the configuration of a power converting device according to a second embodiment of the invention.

While the single-phase multiplex inverter 3 is controlled in such a manner that the inverter current $I_a$ follows the harmonic compensation reference current 24a in the foregoing first embodiment, the embodiment may be so modified as to control the single-phase multiplex inverter 3 such that the line current Is follows a reference current (load current fundamental component value) obtained by smoothing the discrete load current fundamental component value output from the CPU 10 by the filter 23 as shown in FIG. 12.

Also, while the load current $I_L$ is passed through the band-pass filter 13 to remove the harmonic components contained therein and extract the fundamental component which is input into the CPU 10 in the first embodiment, the fundamental component of the load current $I_L$ is extracted by the CPU 10 in this modified form of the first embodiment, or a second embodiment of the invention.

The line current $I_s$ is controlled by varying the inverter current $I_a$ by performing the aforementioned gradational output voltage control of the single-phase multiplex inverter 3 in the second embodiment as well. Consequently, the single-phase multiplex inverter 3 of the second embodiment controls the inverter current $I_a$ to follow the harmonic compensation reference current 24a to cancel out harmonic currents contained in the load current as in the foregoing first embodiment. The second embodiment of the invention therefore produces the same advantageous effects as the first embodiment.

Third Embodiment

Figure 13:
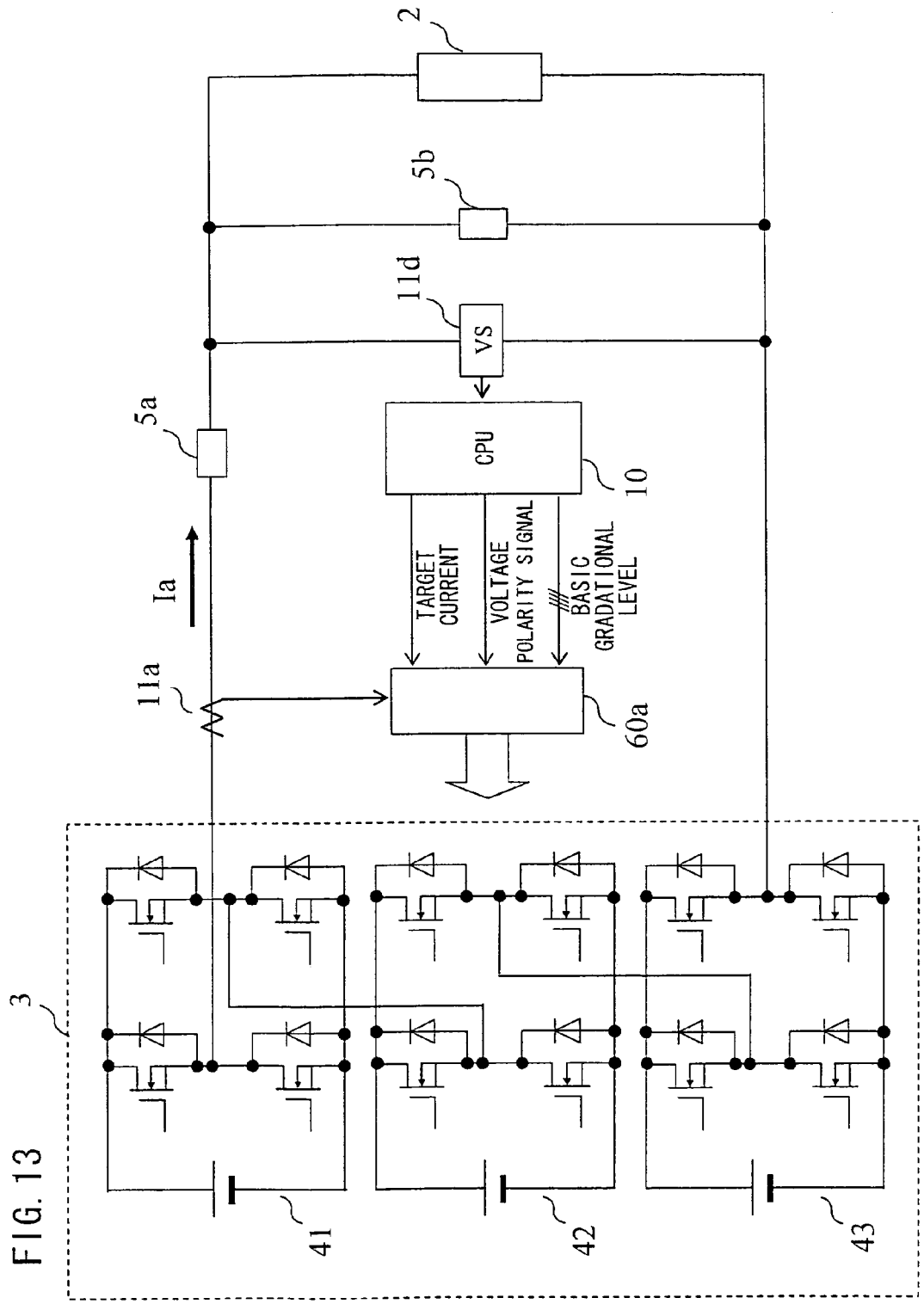
FIG. 13 is a detailed circuit diagram showing the configuration of a power converting device according to a third embodiment of the invention.

While the foregoing embodiments are concerned with the power converting devices used as the active filters, a power converting device of a third embodiment described below is used as a system interconnection inverter for converting DC power fed from a DC power source into AC power and thereby connecting the DC power source to a power system. FIG. 13 is a circuit diagram showing the configuration of the power converting device according to the third embodiment of the invention.

Like the power converting device of the first embodiment, the power converting device of the third embodiment is a single-phase multiplex converter, or a single-phase multiplex inverter 3, in which a plurality of (three in this embodiment) single-phase inverters 41-43 are connected in series. The single-phase multiplex inverter 3 is connected to a load 2 (which is a power system in this embodiment) via a reactor 5a. A capacitor 5b parallel-connected to the load 2 serves as a filter for removing harmonics. Referring to FIG. 13, designated by the numeral 11a is a current sensor, designated by the numeral 11d is a voltage sensor, designated by the numeral 10 is a CPU, and designated by the numeral 60a are peripheral circuits of the CPU 10. The CPU 10 and the peripheral circuits 60a together constitute an inverter driving circuit which serves as a control device.

While the inverter-driving circuit, or the control device, controls the single-phase multiplex inverter 3 in a way similar to the first embodiment with substantially the same configuration, the inverter driving circuit of the third embodiment is given a reference AC voltage instead of the source voltage and the CPU 10 calculates a basic gradational level 18a of the output voltage of the single-phase multiplex inverter 3 based on the waveform of the reference AC voltage. While a target current of the inverter current $I_a$ is determined in accordance with the load 2, it is essential for a system interconnection inverter to produce a sinusoidal AC current having a power factor of 1 so that the inverter current $I_a$ must be controlled with high precision.

Generally, energy sources usable for supplying DC power to a system interconnection inverter include lead storage batteries, fuel cells, solar cells, lithium ion batteries and electric double-layer capacitors. In this embodiment, the DC power is supplied to DC power supplies (i.e., capacitors) of the power converting device via a DC-DC converter (not shown).

If the system interconnection inverter is of a type employing PWM inverters built up of conventional single-phase full-bridge circuits, there arises the need for a large-capacity reactor between the PWM inverters and the power system to establish interconnection thereof by producing an AC current controlled to a sinusoidal waveform to achieve the power factor of 1, so that this configuration results in an increase in physical size of the system interconnection inverter. Additionally, as it is necessary to set DC voltage of the PWM inverters to a level equal to or higher than a maximum value of power system voltage, there arises an increased switching loss which results in a reduction in efficiency of the power converting device.

As in the first embodiment, voltages to be switched can be reduced in the third embodiment and the power converting device of the present embodiment can output a smooth AC waveform with the small-capacity reactor 5a and control the inverter current $I_a$ (AC current) to follow the target current with high precision.

Since the single-phase multiplex inverter 3 of this embodiment is a voltage source inverter, the single-phase multiplex inverter 3 functions as a voltage source which generates a constant voltage regardless of the magnitude or direction of the output current (inverter current $I_a$). If the target current is set in such a way that the inverter current $I_a$ flows in a direction opposite to the direction of the voltage, the single-phase multiplex inverter 3 can be operated as a converter for changing (or rectifying) AC power to DC power. Generally, a bidirectional power converting device works as an inverter when operated for converting electric power from DC to AC, and as a converter when operated for converting electric power from AC to DC.

Figure 14B:
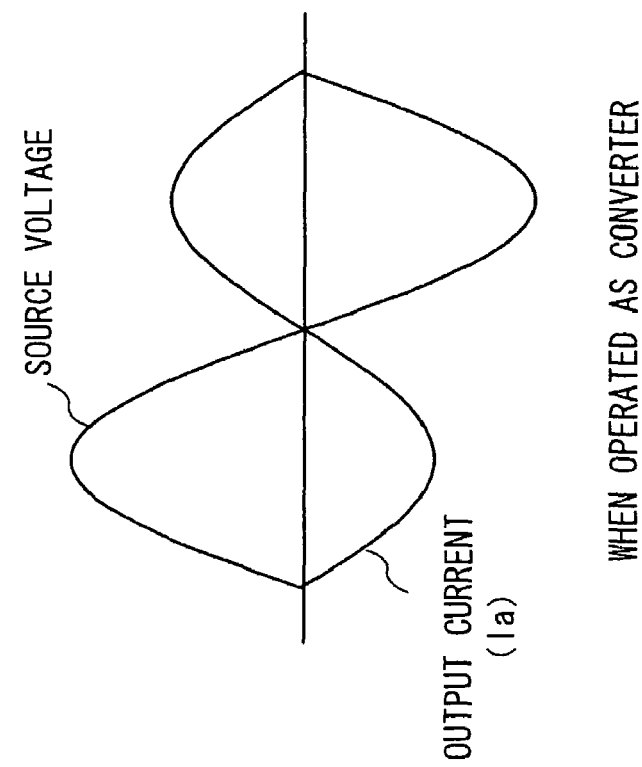
FIGS. 14A and 14B diagrams showing operation of the power converting device of the third embodiment.
Figure 14A:
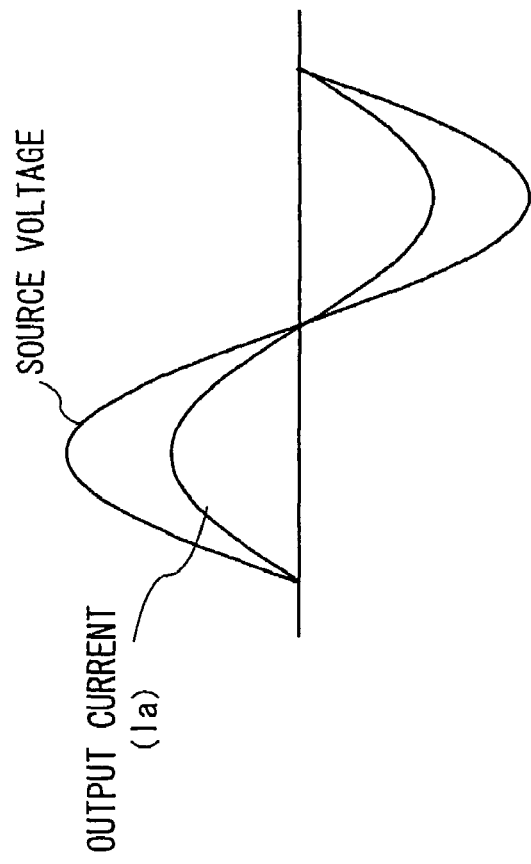

FIGS. 14A and 14B diagrams showing voltage and current waveforms observed when the power converting device of the embodiment is operated as an inverter and as a converter, respectively. The power converting device can supply electric power fed from a DC source to an AC side if the target current is set such that the power converting device works as an inverter as shown in FIG. 14A. Conversely, the power converting device can supply electric power fed from the power system to a DC side if the target current is set such that the power converting device works as a converter as shown in FIG. 14B.

While the third embodiment of the invention has been described with reference to the single-phase multiplex inverter 3 connected to the load 2 which is a power system, the third embodiment is also applicable to a power converting device for supplying electric power to a load which requires high-precision current control.

Fourth Embodiment

A power converting device according to a fourth embodiment of the invention is now described with reference to FIG. 15 which is a circuit diagram showing the configuration of the power converting device of the fourth embodiment applied to a three-phase circuit.

Figure 15:
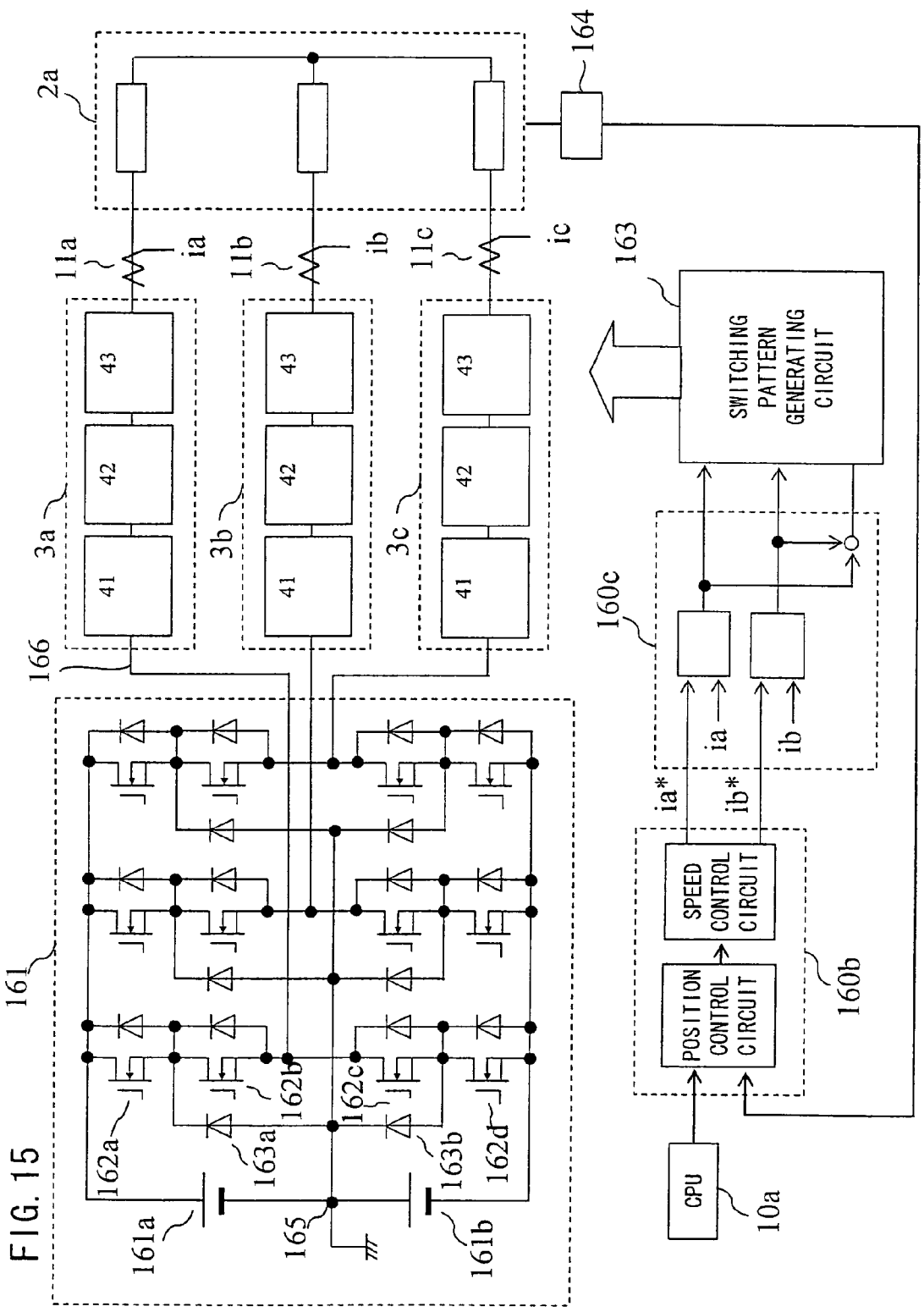
FIG. 15 is a detailed circuit diagram showing the configuration of a power converting device according to a fourth embodiment of the invention.

As shown in FIG. 15, the power converting device is made up of a three-phase, three-level inverter 161 and three single-phase triple inverters 3a-3c to supply electric power to a three-phase load 2a via an unillustrated reactor. Each phase of the power converting device includes one phase portion of the three-phase, three-level inverter 161 and one of the single-phase triple inverters 3a-3c connected in series to an AC side of the one phase portion of the three-phase, three-level inverter 161. This means that the power converting device of the fourth embodiment has a special structure in which each phase is configured by connecting four single-phase inverters in series.

An AC circuit portion of the three-phase, three-level inverter 161 includes a pair of DC power supplies 161a, 161b connected in series with a negative terminal of the DC power supply 161a connected to a positive terminal of the DC power supply 161b.

Described next is how one phase portion of a switching circuit of the three-phase, three-level inverter 161 is configured. Connected between a positive terminal of the DC power supply 161a and a negative terminal of the DC power supply 161b is a series circuit of self-turn-off semiconductor switching devices 162a-162d, such as IGBTs each of which is connected to a diode in reverse parallel directions. An AC output terminal 166 is taken from a point of connection of the switching devices 162a, 162c.

A point of connection of the switching devices 162a, 162b is connected to a cathode of a diode 163a and to a point of connection (i.e., an intermediate potential point 165) of the two DC power supplies 161a, 161b via an anode of the diode 163a. Also, a point of connection of the switching devices 162c, 162d is connected to an anode of the diode 163b and to the intermediate potential point 165 via a cathode of the diode 163b.

The other two phase portions of the switching circuit of the three-phase, three-level inverter 161 are similarly structured and connected in parallel with the above-described one phase portion to configure the three-phase, three-level inverter 161.

Switching operation performed by each phase portion of the three-phase, three-level inverter 161 is now described. It is assumed that the DC power supplies 161a, 161b each provide a voltage V in the following discussion. If the switching devices 162a, 162b are ON and the switching devices 162c, 162d are OFF, the voltage of the DC power supply 161a is applied across the intermediate potential point 165 and the output terminal 166. If the switching devices 162b, 162c are ON and the switching devices 162a, 162d are OFF, the output terminal 166 is at the same potential as the intermediate potential point 165. If the switching devices 162c, 162d are ON and the switching devices 162a, 162b are OFF, the voltage of the DC power supply 161b is applied across the intermediate potential point 165 and the output terminal 166.

Therefore, each phase portion of the three-phase, three-level inverter 161 can output three different voltage levels (+V, 0, −V) at the output terminal 166 relative to the level of the intermediate potential point 165 by switching the ON/OFF states of the switching devices 162a-162d. The other two phase portions of the three-phase, three-level inverter 161 can also output three voltage levels in a similar fashion. Since line voltages in a three-phase system are inter-phase voltage differences, the three-phase, three-level inverter 161 can output five different voltage levels (+2V, +V, 0, −V, −2V).

While the power converting device of this embodiment is a three-level inverter which is generally referred to as a neutral point clamped (NPC) inverter, the invention can be applied to multilevel inverters, not to mention a two-level inverter, employing different circuit configurations.

For applications in power systems-and railways, there are limitations in withstand voltage and switching frequency of switching devices due to high DC input voltage. Multilevel inverters of the aforementioned kind are widely used in the power system and railway applications to provide an output voltage having nearly a sinusoidal waveform. If the power converting device is used to supply electric power to such a load as a motor of which typical examples are an induction motor and a synchronous motor, it may be necessary to meet requirements for achieving low torque ripples and high-performance speed control. To meet such requirements, a vector control technique is used for controlling excitation current and torque current of the motor.

A control device used when the three-phase load 2a is a motor to which the vector control technique is applied is now described with reference to FIG. 15. As shown in FIG. 15, the control device includes a CPU 10a for calculating a rotational (angular) position command or a speed command for the motor, a control circuit 160b for outputting a control signal by feedback control operation so that an actual value of the rotational (angular) position or speed of the motor input from a detector 164 follows the rotational (angular) position command or the speed command, whichever applicable, a current control circuit 160c and a switching pattern generating circuit 163. The control circuit 160b includes a position control circuit, a speed control circuit and a current minor loop for performing vector control operation. The control circuit 160b thus configured outputs target currents ia*, ib* of inverter output currents ia, ib for two of the three phases. The current control circuit 160c generates voltage commands for the individual phases such that the inverter output currents ia, ib fed from current sensors 11a, 11b follow the target currents ia*, ib*, respectively. The switching pattern generating circuit 163 generates gate drive signals for driving each phase portion of the three-phase, three-level inverter 161 and three single-phase inverters 41-43 of each phase.

Since high-precision current control is necessary for performing the vector control operation, there is the need for a fast-response control current source. A conventionally used technique is a current regulating PWM control method in which an inverter output current is controlled to follow a target current by adjusting a voltage command taking advantage of fast voltage responding capability of a voltage source inverter. Although enhanced control performance is achieved by the PWM control method, a PWM inverter switches a high DC voltage at a high frequency, so that the PWM inverter requires a large-sized cooling device due to switching loss. Additionally, if the three-phase load 2a connected to the power converting device is a motor, wirings between the power converting device and the motor have inductance (L) and stray capacitance (C) and, thus, large voltage changes caused by switching operation of the power converting device produce a high-voltage surge due to LC resonance. As a result, a high voltage would be applied to terminals of the motor, eventually causing deterioration of insulation of the motor. While conventional measures adopted for preventing these problems are to enhance insulation of motor windings, reduce the rate of change (dV/dt) of a rising edge of voltage, or employ a surge suppressing filter, for instance, all such measures would result in cost increase.

In the present embodiment of the invention, the three single-phase inverters 41-43 are inserted directly between the output terminal 166 of the three-phase, three-level inverter 161 and the three-phase load 2a for each phase. Thus, a total of four single-phase inverters including each phase portion of the three-phase, three-level inverter 161 and the three single-phase inverters 41-43 are connected in series for each phase, and the output voltage of each phase is controlled by the sum of output voltages of the series-connected four single-phase inverters. Therefore, the power converting device of the fourth embodiment can produce an output voltage shaped into a sinusoidal waveform and control the output current of each phase with high precision.

Furthermore, since changes in the voltages-applied to the three-phase load 2a can be reduced, the power converting device of the embodiment can suppress surge voltages caused by the influence of the inductance and stray capacitance produced by the wirings between the power converting device and the motor and prevent deterioration of insulation of the motor.

What is claimed is:
1. A power converting device comprising:
a plurality of single-phase inverters, each single-phase inverter receiving DC power from a respective DC power supply and producing AC power at an AC-output side, the AC-output sides of the single-phase inverters being connected in series; and a control device for controlling each of the single-phase inverters to deliver an output current corresponding to a predefined output current, the plurality of single-phase inverters producing an output voltage that is the sum of respective output voltages generated by the single-phase inverters in response to control by the control device, wherein the control device includes:

a basic gradational level calculator for calculating a basic gradational level of the output voltage of the plurality of single-phase inverters based on a reference voltage, a gradational level correction value calculator for calculating a gradational level correction value for correcting the basic gradational level so that the output current of the plurality single-phase inverters follows the predefined output current, a gradational output voltage level calculator for calculating a gradational output voltage level for the plurality of single-phase inverters by correcting the basic gradational level using the gradational level correction value, and an inverter control processor for outputting control signals to the plurality of single-phase inverters in accordance with the gradational output voltage level.

2. The power converting device according to claim 1, wherein the DC power supplies input different DC voltages into respective single-phase inverters.

3. The power converting device according to claim 1, wherein the gradational output voltage level is successively varied in equal steps.

4. The power converting device according to claim 1, wherein the gradational level correction value calculator sets a plurality of threshold values for the output current of the plurality of single-phase inverters and varies the gradational level correction value for adjusting the gradational output voltage level each time the output current of the plurality of single-phase inverters exceeds one of the threshold values.

5. The power converting device according to claim 4, wherein the gradational level correction value calculator varies the gradational level correction value to adjust the gradational output voltage level, decreasing the output current of the plurality of single-phase inverters when the output current becomes larger than one of the threshold values that is larger than the predefined output current, and increasing the output current of the plurality of single-phase inverters when the output current becomes smaller than one of the threshold values that is smaller than the predefined output current.

6. The power converting device according to claim 4, including a filter connected to an output of the plurality of single-phase inverters connected in series, wherein each of the single-phase inverters includes a plurality of switching devices, and a difference from one threshold value to another threshold value is based on a voltage value corresponding to one gradational level change, a constant of the filter, and maximum switching frequency of the switching devices.

7. The power converting device according to claim 1, wherein the basic gradational level calculator includes a central processing unit, and the gradational level correction value calculator, the gradational output voltage level calculator, and the inverter control processor include at least one external logic circuit having a higher processing speed than the central processing unit.

8. A power converting device comprising:

a plurality of single-phase inverters connected in parallel to an AC power supply, each single-phase inverter receiving DC power from a respective DC power supply and producing AC power at an AC-output side, the AC-output sides of the single-phase inverters being connected in series; and a control device for controlling each of the single-phase inverters to deliver an output current for correcting a line current fed from the AC power supply, by gradational output voltage control so that the single-phase inverters produce an output voltage that is the sum of respective output voltages generated by the single-phase inverters, the control device including a basic gradational level calculator for calculating a basic gradational level of the output voltage of the plurality of single-phase inverters based on source voltage of the AC power supply, a gradational level correction value calculator for calculating a gradational level correction value for correcting the basic gradational level so that the output current of the plurality of single-phase inverters follows a target current, a gradational output voltage calculator for calculating a gradational output voltage level for the plurality of single-phase inverters by correcting the basic gradational level using the gradational level correction value, and an inverter control processor for outputting control signals to the plurality of single-phase inverters in accordance with the gradational output voltage level.

9. The power converting device according to claim 8, wherein the DC power supplies input different DC voltages into respective single-phase inverters.

10. The power converting device according to claim 8, wherein the gradational output voltage level is successively varied in equal steps.

11. The power converting device according to claim 8, wherein the gradational level correction value calculator sets a plurality of threshold values for the output current of the plurality of single-phase inverters and varies the gradational level correction value for adjusting the gradational output voltage level each time the output current of the plurality of single-phase inverters exceeds one of the threshold values.

12. The power converting device according to claim 11, wherein the gradational level correction value calculator varies the gradational level correction value to adjust the gradational output voltage level, decreasing the output current of the plurality of single-phase inverters when the output current becomes larger than one of the threshold values that is larger than the target current, and increasing the output current of the plurality of single-phase inverters when the output current becomes smaller than one of the threshold values that is smaller than the target current.

13. The power converting device according to claim 11, including a filter connected to an output of the plurality of single-phase inverters, wherein each of the single-phase inverters includes a plurality of switching devices and a difference from one threshold value to another threshold value is based on a voltage value corresponding to one gradational level change, a constant of the filter and maximum switching frequency of the switching devices.

14. The power converting device according to claim 8, wherein basic gradational levels successively calculated by the basic gradational level calculator define voltages which form a stepwise waveform inscribed in or circumscribed about each half-wave portion of the source voltage of the AC power supply.

15. The power converting device according to claim 8, wherein the basic gradational level calculator includes a central processing unit, and the gradational level correction value calculator, the gradational output voltage level calculator, and the inverter control processor include at least one external logic circuit having a higher processing speed than the central processing unit.

\* \* \* \* \*